(12) United States Patent
Thuesen

(10) Patent No.: US 8,469,061 B2
(45) Date of Patent: Jun. 25, 2013

(54) CLAMP FOR SECURING A PIPE TO A SUPPORTING STRUCTURE

(76) Inventor: Jørgen Thuesen, Mørkøv (DK)

( * ) Notice: Subject to any disclaimer, the term of this patent is extended or adjusted under 35 U.S.C. 154(b) by 236 days.

(21) Appl. No.: 12/990,135

(22) PCT Filed: Apr. 21, 2009

(86) PCT No.: PCT/EP2009/054714
§ 371 (c)(1),
(2), (4) Date: Oct. 28, 2010

(87) PCT Pub. No.: WO2009/132988
PCT Pub. Date: Nov. 5, 2009

(65) Prior Publication Data
US 2011/0126934 A1     Jun. 2, 2011

(30) Foreign Application Priority Data
Apr. 28, 2008  (EP) .................................. 08103747.5

(51) Int. Cl.
*F16L 3/00*      (2006.01)
(52) U.S. Cl.
USPC .............................. 138/106; 248/74.1; 29/428
(58) Field of Classification Search
USPC ............ 138/106, 108; 248/74.1, 74.3; 29/428
See application file for complete search history.

(56) References Cited

U.S. PATENT DOCUMENTS

| | | | | |
|---|---|---|---|---|
| 2,049,184 A | * | 7/1936 | Walsleben | 138/106 |
| 2,134,393 A | * | 10/1938 | Bennett | 52/220.1 |
| 3,154,281 A | * | 10/1964 | Charles | 248/201 |
| 3,370,815 A | * | 2/1968 | Opperthauser | 248/74.2 |
| 4,258,515 A | * | 3/1981 | Owen | 52/105 |
| 4,927,103 A | * | 5/1990 | Nicholson | 248/62 |
| 4,934,635 A | * | 6/1990 | Sherman | 248/74.1 |
| 4,997,148 A | * | 3/1991 | Sherman | 248/74.1 |
| 5,690,038 A | * | 11/1997 | Merit et al. | 108/60 |

FOREIGN PATENT DOCUMENTS

| | | |
|---|---|---|
| DE | 77 10 649 | 9/1978 |
| DE | 86 28 193.3 | 12/1986 |
| FR | 1.477.777 | 4/1967 |
| FR | 2.044.993 | 2/1971 |
| GB | 268497 | 7/1927 |
| GB | 1076683 | 7/1967 |

OTHER PUBLICATIONS

International Search Report and Writtn Opinion, PCT/EP2009/054714, Mailed Jul. 20, 2009.

* cited by examiner

*Primary Examiner* — Patrick F Brinson
(74) *Attorney, Agent, or Firm* — Winston & Strawn LLP

(57) ABSTRACT

A clamp for securing a pipe to a supporting structure and including a base having a foot for attachment to a supporting structure and a head having a seating for accommodating a pipe and two walls for defining the seating, an entrance for the pipe extending between the two walls, and an U-formed strap for clamping a pipe placed in the seating to the base. The strap has two legs for engaging opposite contact faces formed in the base and a curved bottom for surrounding the pipe together with the walls of the head. The radius of curvature of the inner side of curved bottom of the U-formed strap is larger than that of the seating. The clamp enables a secured pipe to noiselessly expand or contract depending upon the temperature and is mainly corrosion free due to the clearance that is formed between the strap and the clamped pipe.

20 Claims, 3 Drawing Sheets

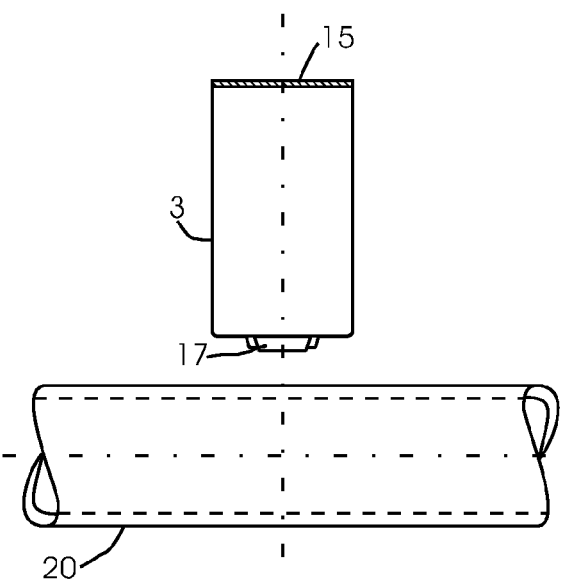
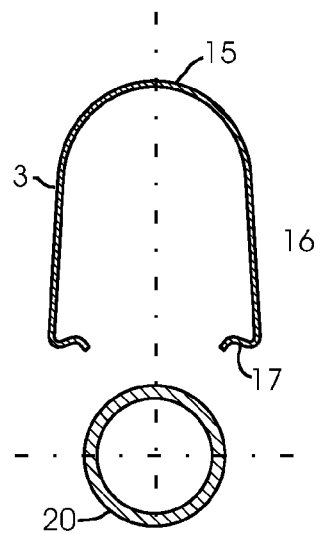
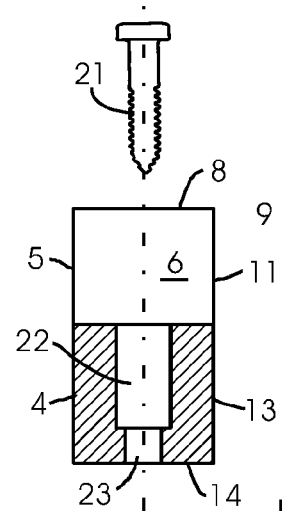
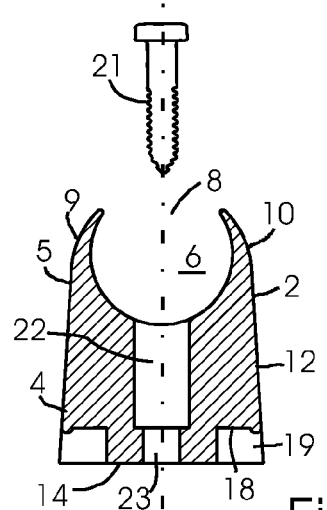
Fig. 3
Fig. 5
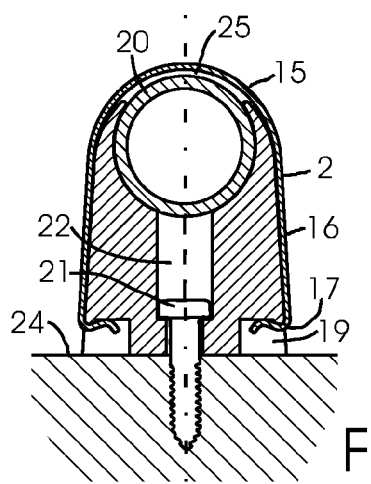
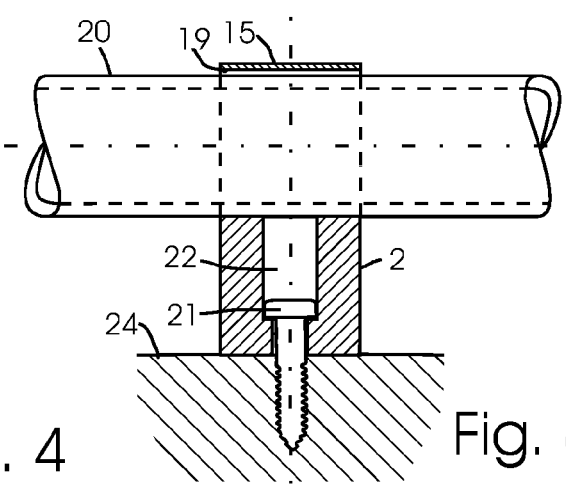
Fig. 4
Fig. 6

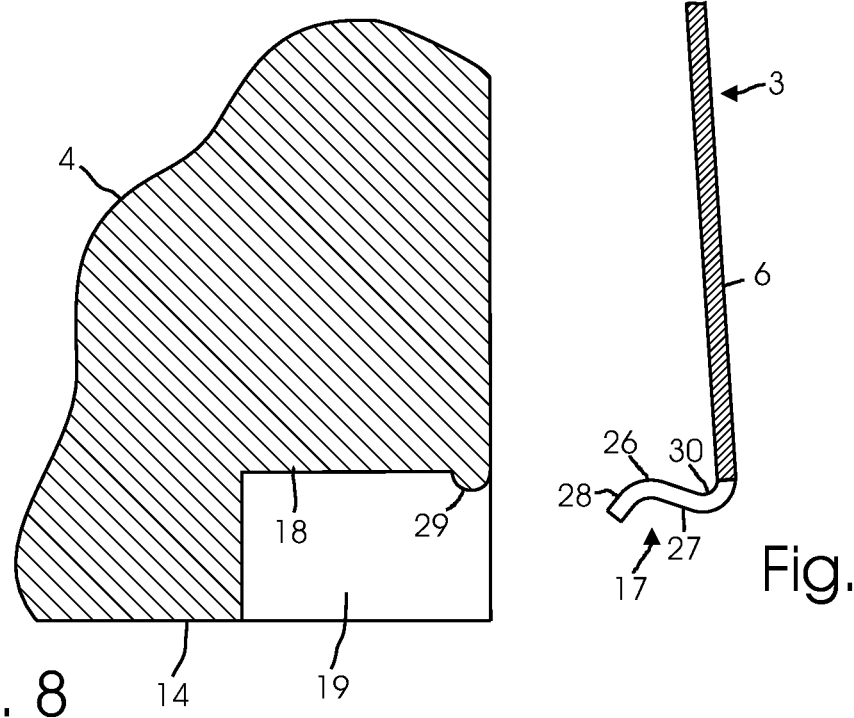
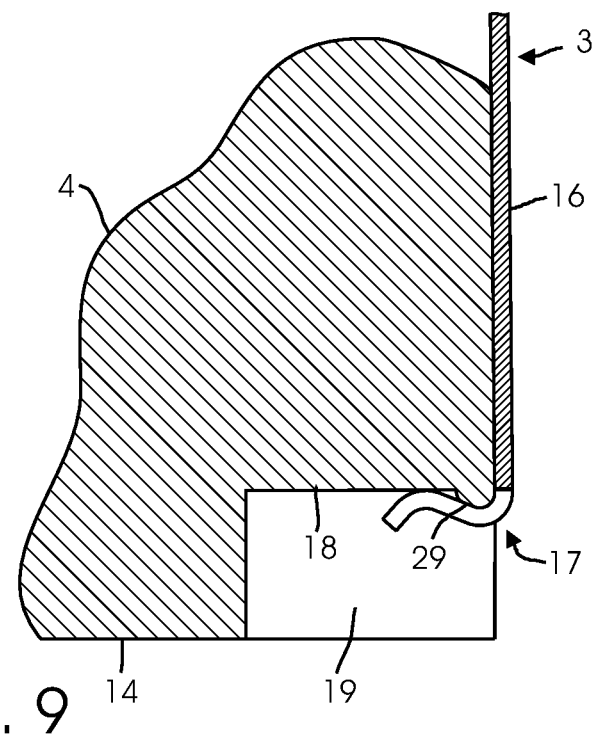

CLAMP FOR SECURING A PIPE TO A SUPPORTING STRUCTURE

This application is a 371 filing of International Patent Application PCT/EP2009/054714 filed Apr. 21, 2009.

BACKGROUND

The invention relates to a clamp for securing a pipe to a supporting structure like for example a wall in a building.

The clamp comprises a base with a foot for being attached to the supporting structure and a head with a seating for in use accommodating a pipe, two walls of the head defining the seating, an entrance for the pipe extending between the two walls, and an U-formed strap for clamping a pipe placed in the seating to the base whereby the strap is having two legs equipped each with a hook for in clamping position engaging opposite contact faces in cavities formed in the foot of the base and a curved bottom for at the same time surrounding the pipe together with the walls of the head.

The term pipe is standing here for an elongated element like a cable, a solid bar, or a pipe like a water pipe, a heating pipe ore a gas pipe.

Pipes are frequently secured to e.g. walls in buildings by means of clamps placed in positions where they risk to be destroyed more or less by accident or vandalism. It therefore is required that the clamps have a construction, which is strong and strenuous to separate.

Another problem consists in the fact that a pipe, which often can be relatively long, expands and contracts with varying ambient temperature and/or the temperature of the medium flowing in the pipe whereby the clamps will be exposed to alternating crosswise acting forces. The clamps therefore should be arranged for being securely and stable attached to the wall.

The clamps also need to be able quickly and easily to securing the pipe to the wall since many clamps frequently are used for installing often-large quantities of pipes required in a building.

Of the same reason the clamps also should have an inexpensive construction.

From the patent FR No. 1.477.777 is known a clamp for securing a pipe to a wall. The clamp has a base with a seating for the pipe and a semicircular strap, which spans the pipe when being attached to the base by means of two hooks engaging each their slit in the top of the thin wall around the seating. The hooks are straight and short and the depth of the cooperating slits is little. The connection between the strap and the base therefore is extremely weak already of that reason. The hooks moreover easily disengage the slits by accidentally or intended opening the strap owing to the semicircular shape of this.

Another problem consists in the fact that the bearing face of the base has a very little area with the result that the securing of the base and thereby of the pipe to the wall will be week and unreliable.

A similar construction is disclosed in the publication GB 1,076,683. The strap is in this case attached to the base by means of dovetail projections engaging dovetail shaped recesses formed in the base. According to this publication is the strap secured to the base by first flexing apart the arms of the strap and then let the projections snap into engagement with the recesses. That means obviously that the engagement should take place in a sideways movement of the projections into the recesses by using only the spring force of the relatively thin strap. The spring force of the strap is however relatively little owing to the arched shape of the strap. The projections therefore easily disengage the recesses by accidentally or intended opening the weak strap. The bearing face of the base has a large extension crosswise the pipe but a little extension into the axial direction of the pipe. That implies that securing of the base and thereby of the pipe to the wall will be unreliable into the axial direction of the pipe where the clamps in dependence of the varying temperatures of the pipe are exposed to alternating crosswise acting forces. This known clamp has a complicated and costly construction, which moreover is laborious and time-consuming to use for fitting a pipe to a support structure.

Similar clamps are known from the documents, DE 77 10 649 U1, DE 86 28 193 U1, FR 1 477 777 A, FR 2 044 993 A and GB 268 497 A.

Common for these known techniques and the techniques of the documents previously mentioned are however that they are somewhat noisy in use and also tend to corrode.

The above-mentioned disadvantages of the prior art clamps for securing a pipe to a supporting structure like for example a wall in a building are according to the present invention remedied by, in a first aspect of the invention providing a clamp with a construction which allows the secured pipe mainly noiseless to expand or contract in dependence of varying temperatures, in a second aspect of the invention providing a clamp with a corrosion free construction, in a third aspect of the invention providing a clamp which have a strong and stable construction, in a fourth aspect of the invention providing a clamp which have a construction which is strenuously to separate, in a fifth aspect of the invention providing a clamp arranged for being securely and stably attached to a supporting structure, in a sixths aspect of the invention providing a clamp able to quickly and easily securing the pipe to a supporting structure, in a seventh aspect of the invention providing a clamp having a simple and inexpensive construction, in a eight aspect of the invention providing a clamp having a durable construction, in a ninth aspect of the invention providing a clamp with a construction which allows the secured pipe mainly noiseless to expand or contract in dependence of varying temperatures,

SUMMARY OF THE INVENTION in a tenth aspect of the invention providing a clamp which has a nice appearance.

The novel and unique features of the invention whereby these features are achieved consists in the fact that the distance from the centre of the seating to the inner side of the curved bottom of the U-formed strap is larger, seen in the clamping position of the strap, than the radius of curvature of the seating.

Thereby is according to the invention advantageously obtained that a pipe placed in the seating noiseless or at least with a minimum of noise is allowed to expand or contract axially in dependence of varying temperatures while axially sliding in the clamp especially when the base is made of an elastic material like a ductile material as e.g. polypropylene so that the head of the base easily can follow the concurrent changing of the cross section of the pipe.

Another advantage according to the invention consists in the fact that galvanic corrosion between a strap of e.g. steel and a pipe of e.g. copper or brass can be avoided when the two metals is without any contact with each other.

Conventionally is the strap clamping the pipe to the base by pressing the pipe against the seating of the base resulting in that a reaction force from the pipe is acting upon the strap.

Said reaction force produces an essential friction between the pipe and the strap rocking the strap around the point where the hooks of the strap is engaging the foot of the base because the pipe expands and contracts with the temperature whereby the clamp will destroy itself in the course of time.

This serious problem is remedied by using the clamp of the invention since the strap in this case is not as conventionally pressing the pipe against the base but on the contrary is clamping the base to the pipe without even touching this.

According to the invention can the curved bottom of the U-formed strap be acting onto the walls of the head with a pipe in the seating so that the pipe tightly is clamped between said walls by bending the walls.

Each wall of the head of the base can according to the invention be formed with elasticity and bending strength allowing such bending of the walls.

When the walls is tapering against the entrance to the seating is according to the invention moreover advantageously achieved that the bending strength decreases into the direction of the top of the walls so that the pressure of the walls upon the pipe gradually increases and the pipe thereby advantageously is acted upon by downwards directed components of forces when the width of the entrance is smaller than the diameter of the pipe. This construction implies that the base securely can be clamped to the pipe.

The strap can according to the invention be made of a band of metal and be stressing the walls of the head with the forces necessary for bending the walls of the head tightly round the pipe whereby the curved bottom of the strap is acted upon by the reaction of these forces.

The curved bottom of the U-formed strap therefore according to the invention can have a bending strength large enough to prevent the bottom to be deflected more than the clearance to a pipe clamped to the base when being exposed to the action of the reaction of the forces stressing the walls.

In a preferred embodiment of the invention can the base be formed with two opposite sides extending crosswise to the seating whereby the strap can have a width corresponding to the distance between those sides.

The clamp thereby is achieving a nice appearance simultaneously with that the strap is forming a protecting cover over the base, which may be of a softer material like e.g. polypropylene while the strap may be of a harder material like e.g. stainless steel.

The width of the hooks of the strap can moreover be lesser than the width of the remainder of the strap whereby advantageously is obtained that the strap is fixed against being displaced in the longitudinal direction of the pipe.

The foot of the base of the clamp can according to the invention have bearing face with a relatively large area so that the clamp securely and stable can be attached to a supporting structure for the pipe.

Said attachment of the pipe to the supporting structure can according to the invention moreover easily and quickly be performed by means of one or more fasteners like e.g. screws passed through associated bores in the base.

Each hook of the strap can according to the invention furthermore be formed as a V with apex pointing toward the curved bottom of the U-formed strap whereby the contact face for engaging the hook can be formed with a projection so that the hook accidentally or intended is very difficult and strenuous to separate from the base and that the clamp therefore is hard to destroy.

In a preferred embodiment according to the invention can the outer sides of the head and foot of the base be merging tangentially into each other at the same side of the seating so that the strap easily can be attached upon the base when clamping a pipe.

BRIEF DESCRIPTION OF THE DRAWINGS

The invention will be explained in greater details below where further advantageous properties and example embodiments are described with reference to the drawings, in which FIG. 3 is an exploded view of a lateral cross section taken across a pipe to be secured to a supporting structure, including the strap seen in FIG. 2, the pipe, a fastener for securing the clamp to the supporting structure, and the base seen in FIG. 1, FIG. 4 shows the assembling of the parts shown in FIG. 3 secured to the supporting structure, FIG. 5 is an exploded view of a lateral cross section of the parts shown in FIG. 3, but taken along the pipe, FIG. 6 shows the assembling of the parts shown in FIG. 5 secured to the supporting structure, FIG. 7 is a lateral view of a fragment of a cross section of the strap shown in FIG. 2, FIG. 8 is a lateral view of a fragment of a cross section of the base shown in FIG. 1, and FIG. 9 shows the assembling of the strap and base shown in FIGS. 7 and 8, respectively.

The following detailed description of the invention is by way of example based on the assumption that the clamp of the invention is a heating pipe and that the supporting structure for the pipe is a supporting wall in a building.

Figure 2:
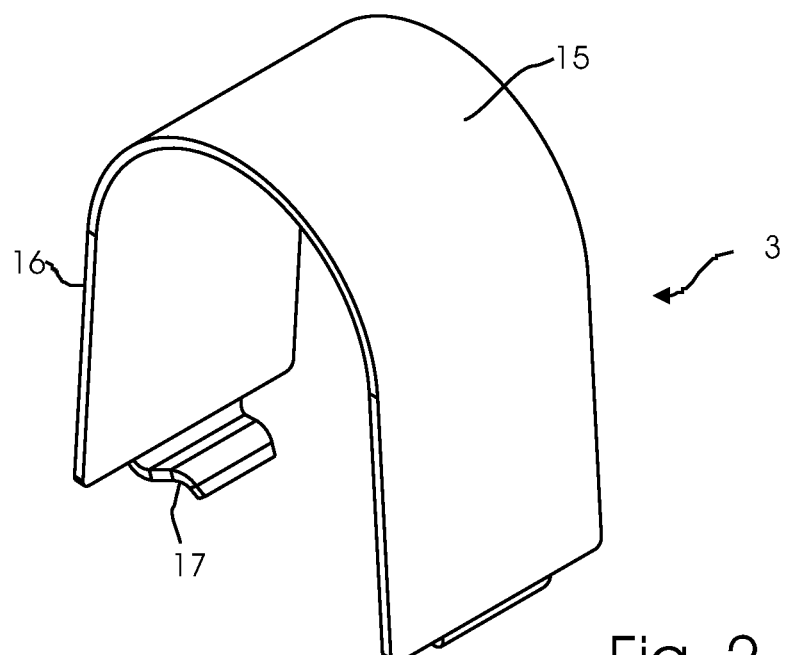
FIG. 2 is a perspective view of a strap to the clamp of the invention.
Figure 1:
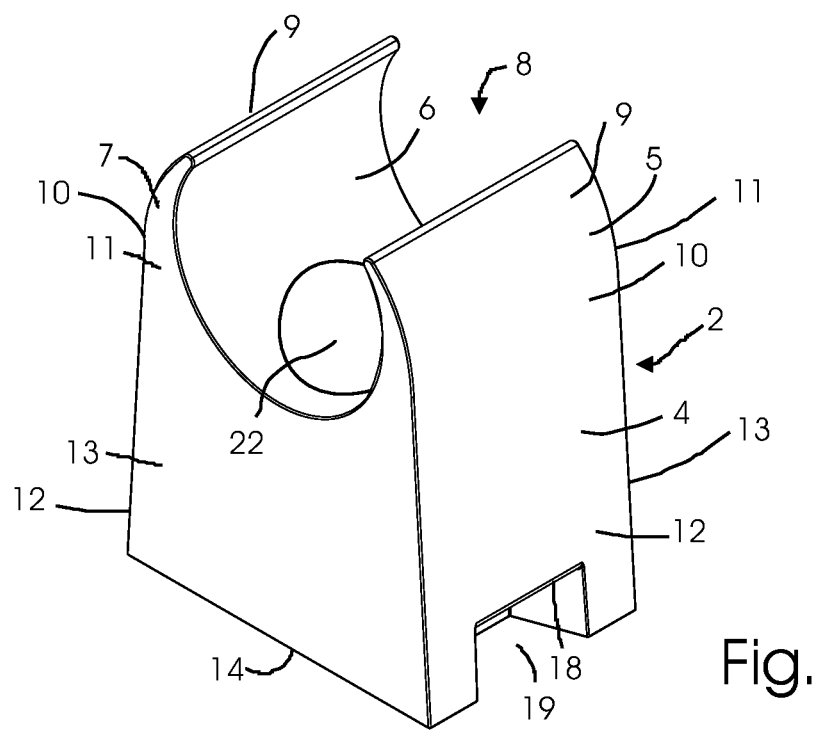
FIG. 1 is a perspective view of a base of a clamp of the invention.

FIGS. 1 and 2 shows an exploded view, seen in perspective, of the clamp 1, which as seen comprises a base 2 and a strap 3.

DETAILED DESCRIPTION OF THE INVENTION

The base consists of a foot 4 for securing the base to the wall (not seen) by means of a fastener like e.g. a screw (not seen) and of a head 5 for securing the pipe (not seen) to the base by means of a traversing seating 6 for accommodating the pipe.

The seating 6 is partly surrounded by walls 7 of the head whereby the walls are limiting an entrance 8 for allowing the pipe to be passed into the seating.

The width of this entrance is smaller than the diameter of the pipe so that the wall is surrounding the pipe along an angle of an arch of more than 180 degrees.

The base and thereby said walls of the head is made of a ductile material like e.g. polypropylene causing the walls round the seating to be able to flex.

The entrance to the seating therefore temporary can be expanded sufficiently to allow the pipe to pass into the seating. The walls round the seating can moreover flex in accordance with the varying diameters of the pipe, which will expand or contract in dependence of the temperature of the pipe.

The capability of the walls round the seating to flex is moreover improved by tapering the walls 7 of the head 2 against the entrance 8 to the seating 6.

The shape of the base 2 is in the main formed like an obelisk with opposite outer sides 10 of the head 5 tangentially merging into opposite sides 12 of the foot 4 whereby a large bearing face 14 for the base is achieved for securely and stable attaching the base to the supporting wall of the building.

The obelisk formed shape of the base also is imparting a strong and durable structure to the base and a very nice appearance to the clamp.

The strap 3 is in the present embodiment made of an elastic band of metal, e.g. stainless steel. The elasticity of the metal makes the strap able to flex sufficiently. Using a material like stainless steel implies that the strap will be strong even if the band of metal is thin.

The strap is arranged for being secured to the base and in secured state to cover the entrance to the seating in which a pipe is placed.

The strap 3 is for that purpose formed as a U with a curved bottom 15 for covering the entrance 8 to the seating 6 and two legs 16 equipped with hooks 17 for securing the strap to the base by engaging opposite contact faces 18 in cavities 19 formed in the base 2.

FIG. 3 is an exploded view of a cross section of the clamp comprising the elastic strap 3, a pipe 20, a screw 21 and the base 2. The cross section is taken across the pipe.

FIG. 5 shows the same parts 3, 20, 21 and 2 as seen in FIG. 3 but in a cross section taken along the pipe 20.

In the foot 4 of the base 2 is formed a first bore 22 extending from the seating 6 in the head 5 and a second bore 23 extending from the first bore 22 to the bearing face on the foot 4.

FIG. 4 shows the assembling of the parts shown in FIG. 3 secured to a supporting wall 24, and FIG. 6 shows the assembling of the parts shown in FIG. 5 secured to the supporting wall 24.

The pipe 20 is quickly and easily attached to the supporting wall 24 by means of the clamp according to the invention in the following way.

The foot 4 of the base 2 is placed on the supporting wall 24 with its bearing face 14 bearing against said wall. The screw then is passed through the bores 22 and 23 in the foot and screwed into the wall. Other types of fasteners can within the scope of the invention be used instead of a screw.

The pipe 20 then is pressed into the seating 6 for the pipe through the entrance 8 in the flexible wall 7 of the head 5 of the base 2. The pipe 20 now is firmly anchored in the base 2.

Afterwards is the flexible U-formed strap 3 pressed across the base until the hooks 17 of the strap snap into the cavities 19 in the foot 4 of the base 2 and engage the contact faces 18 in the cavities 19.

This operation is easy to perform owing to the large flexibility of the material of the strap and to the fact that the opposite outer sides 10 of the head 5 tangentially are merging into the opposite sides 12 of the base 2 so that the hooks is allowed to slide over the smooth transition between said sides 10 and 12 without any hindrance.

The pipe 20 is now, as shown in FIG. 4 and FIG. 6, stably secured to the clamp 1 while the clamp itself stably is secured to the support wall 14.

This construction is strong and also strenuously to separate, since the bore 22,23 with the screw 21 is concealed by the pipe and the hooks are locked by the engagement with the contact faces in the cavities.

The pipe slides, as previously mentioned, in the clamp because the pipe expands or contracts in dependence of varying temperatures of the pipe. Sliding along the base, which is made of a ductile material like e.g. polypropylene doesn't generate noise of any importance, but sliding along the strap, which is made of e.g. stainless steel, would generate inconvenient noise.

The bottom 15 of the strap 3 therefore is formed in such way that a clearance 25 is formed between the strap 3 and the pipe 24 so that the strap is not able to touch the pipe.

No noise at all then can be generated since the strap now doesn't touch the pipe.

Another advantageous consists in the fact that galvanic corrosion between a strap of e.g. spring steel and a pipe of e.g. copper or brass cannot arise when the two metals is without any contact with each other.

Instead is the curved bottom 15 of the U-formed strap 3 bearing against the outside of the head 5 of the base 2 at areas adjacent to the entrance 8 to the seating 6. This feature implies advantageously that the tapering walls of the head are firmly tightened about the pipe 20 in the seating 6.

The legs 16 of the U-formed strap 3 are straight and therefore able to transmit a large force from the curved bottom 15 of the strap 3 to the hooks 17.

FIG. 7 shows in a larger scale a fragment of the strap 3. The hook 17 of the strap is formed as a V with apex 26 pointing toward the curved bottom (not seen) of the U-formed strap.

The V has a first side 27 connected to the leg 16 of the strap and a second side 28 connected to the first side 27 only.

FIG. 8 shows in a larger scale a fragment of the foot 4 of the base. The contact face 18 for engaging the hook 17 is at the entrance to the cavity 19 in the foot 4 formed with a projection 29.

The hook 17 is in FIG. 9 snapped into the cavity 19 as the leg of the strap 3 and the hook 17 itself is able to flex sufficiently for allowing the hook to pass the projection 29 on the contact faces 18 in the cavity 19.

The second side 28 of the V is effectively contributing to the flexing of the hook since this side of the V is the first part of the strap, which is engaging the projection 29 on the contact face 18.

The pipe will in use tend to slide along the strap owing to the fact that the length of the pipe is changing with varying temperatures whereby inconvenient noise is generated when the pipe is of metal like e.g. stainless steel. A clearance therefore is arranged between the strap and the pipe so that the strap cannot touch the pipe.

As seen in FIG. 9 is the projection 29 securely locking the hook 17 to the foot 4 by engaging a groove 30 formed in the first side of the hook. The hook now is extremely difficult to disengage from the contact face 18.

The width of the strap 3 corresponds to the width of the base 2, but as best seen in FIGS. 1 and 2 has the cavity 19 in the foot 4 of the base 2 and the hook 17 on the strap 3 a width, which is smaller than the width of the foot and the strap.

Thereby is advantageously obtained that the strap is secured against being displaced sideways on the base, which is into the axial direction of the pipe. The strap therefore cannot be released from the base by sideways displacement on the base.

In the embodiment of the invention shown in FIG. 2, in which the strap particularly easy and quickly can be mounted upon the base, is each hook moreover tapering into the direction outwards from the respective leg of the strap whereby advantageously is achieved that the strap automatically becomes self-centering by being mounted to the base.

In another embodiment of the invention (not shown) is the base secured to the supporting wall by means of a stud screw fastened to the supporting wall and a screw nut formed in the base or alternatively by means of a screw nut fastened to the supporting wall and a stud screw formed on the base. The base then is secured to the support wall by being screwed onto the stud screw or the screw nut, respectively.

By means of the construction described above of the clamp according to the invention is thus provided a strong and stable clamp, which is easy to fit and strenuously to separate and which moreover has a nice appearance.

The invention is above described on the assumption that the clamp of the invention is a heating pipe and that the supporting structure for the pipe is a supporting wall in a building.

The clamp can however within the scope of the invention just as well be used for securing any other elongated elements like for example cables and solid bars to a supporting wall in a building, and the supporting wall could be any other supporting structure like for example a ceiling in a building or a wall or ceiling in a ship.

What is claimed is:

1. A clamp for securing a pipe or other elongated element to a supporting structure, comprising:
    a base that includes a foot for attachment to the supporting structure;
    a head that includes a seating for accommodating the elongated element, two walls for defining the seating, and an entrance for the elongated element extending between the two walls; and
    a U-formed strap for clamping the elongated element in the seating to the base whereby the strap has two legs each equipped with a hook for, in a clamping position, engaging opposite contact faces in cavities formed in the foot of the base, and a curved bottom for at the same time surrounding the elongated element together with the walls of the head without contacting the elongated element;
    wherein a distance measured from the center of the seating to the inner side of the curved bottom of the U-formed strap is larger than the radius of curvature of the seating when viewed in the clamping position of the strap to form a clearance between the strap and the elongated element so that the strap is not able to contact the elongated element.

2. The clamp of claim 1, wherein the base is arranged such that the curved bottom of the U-formed strap stresses the walls of the head with a force when the elongated element is clamped to the base.

3. The clamp of claim 2, wherein each wall of the head is formed with a bending strength that allows the walls to be bent firmly against the elongated element that is to be clamped to the base, influenced by the reactions of the forces that stress the walls.

4. The clamp of claim 1, wherein each of the walls is tapered against the entrance to the seating.

5. The clamp of claim 1, wherein at least the curved bottom of the strap has a bending strength that is large enough to prevent the bottom to be deflected so much that the inner side of the bottom touches a circle with the same center and radius of curvature as the seating when exposed to the action of the reaction of the forces that stress the walls.

6. The clamp of claim 1, wherein the outer sides of the head and foot, respectively, merge tangentially into each other at the same side of the seating.

7. The clamp of claim 1, wherein each hook is formed as a V with an apex pointing toward the curved bottom of the U-formed strap and that the contact face for engaging the hook is formed with a projection at the entrance to the respective cavity and each hook has a width that is less than that of the strap, and wherein each hook tapers in the direction outwards from the respective leg of the strap.

8. The clamp of claim 1, wherein the strap is made of a band of metal.

9. The clamp of claim 8, wherein at least the walls of the head of the base are made of an elastic or ductile material.

10. The clamp of claim 9, wherein at least the walls of the head of the base are made of polypropylene.

11. The clamp of claim 1, wherein the elongated element to be attached to the supporting structure is a pipe, cable or a solid bar.

12. A combination of the clamp of claim 1 and an elongated element attached to a supporting structure.

13. The combination of claim 12, wherein the elongated element is a pipe, cable or a solid bar.

14. The combination of claim 12, wherein the supporting structure is a wall or a ceiling.

15. A method of attaching an elongated element to a supporting structure which comprises providing the clamp of claim 1 wherein the foot of the base is attached to the supporting structure, receiving the elongated element in the seating of the head; and clamping the elongated element together with the walls of the head in the seating to the base by engaging the hooks of the two legs of the U-formed strap.

16. The method of claim 15, wherein the strap of the clamp is made of a band of metal and at least the walls of the head of the base are made of an elastic or ductile material.

17. The method of claim 15, wherein the elongated element to be attached to the supporting structure is a pipe, cable or a solid bar.

18. The method of claim 15, wherein the supporting structure is a wall or a ceiling.

19. The clamp of claim 1, wherein the base is formed with two opposite sides extending crosswise to the seating, with the strap having a width corresponding to a distance measured between those sides while the width of each of the hooks is less than the distance between those sides.

20. A clamp for securing a pipe or other elongated element to a supporting structure, comprising:
    a base that includes a foot for attachment to the supporting structure;
    a head that includes a seating for accommodating the elongated element, two walls for defining the seating, and an entrance extending between the two walls for receiving the elongated element; and
    a U-formed strap for clamping to the base the elongated element that is received in the seating whereby the strap has two legs each equipped with a hook for, in a clamping position, engaging opposite contact faces in cavities formed in the foot of the base, and a curved bottom for at the same time surrounding the elongated element together with the walls of the head without contacting the elongated element;
    wherein the center of the seating to the inner side of the curved bottom of the U-formed strap has a distance that is larger than the radius of curvature of the seating when viewed in the clamping position of the strap to form a clearance between the strap and the elongated element so that the strap is not able to contact the elongated element; and
    wherein the base is formed with two opposite sides extending crosswise to the seating, with the strap having a width corresponding to a distance measured between those sides while the width of each of the hooks is less than the distance between those sides, such that the pipe or elongated element placed in the seating is able to expand or contract axially in dependence of varying temperatures in a noiseless manner or at least with a minimum of noise due to the axial sliding of the pipe or elongated element in the clamp.

* * * * *

UNITED STATES PATENT AND TRADEMARK OFFICE
CERTIFICATE OF CORRECTION

PATENT NO. : 8,469,061 B2  
APPLICATION NO. : 12/990135  
DATED : June 25, 2013  
INVENTOR(S) : Thuesen Page 1 of 1

It is certified that error appears in the above-identified patent and that said Letters Patent is hereby corrected as shown below:

In the Specifications:

Column 2:
Line 46, delete the heading "SUMMARY OF THE INVENTION".
Between lines 49 and 50, insert the heading -- SUMMARY OF THE INVENTION --.

Signed and Sealed this
Thirteenth Day of August, 2013

Teresa Stanek Rea
*Acting Director of the United States Patent and Trademark Office*